United States Patent
Shin et al.

(10) Patent No.: US 10,234,729 B2
(45) Date of Patent: Mar. 19, 2019

(54) LIQUID CRYSTAL DISPLAY DEVICE AND METHOD FOR MANUFACTURING THE SAME

(71) Applicant: Samsung Display Co. Ltd., Yongin (KR)

(72) Inventors: Beom Soo Shin, Hwaseong-si (KR); Hye Lim Jang, Hwaseong-si (KR); Young Joo Jeon, Seoul (KR); Kang Seob Jeong, Seongnam-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 46 days.

(21) Appl. No.: 15/340,414

(22) Filed: Nov. 1, 2016

(65) Prior Publication Data

US 2017/0123277 A1 May 4, 2017

(30) Foreign Application Priority Data

Nov. 3, 2015 (KR) .................. 10-2015-0153862

(51) Int. Cl.
*G02F 1/137* (2006.01)
*G02F 1/1333* (2006.01)
(Continued)

(52) U.S. Cl.
CPC ........ *G02F 1/133788* (2013.01); *G02F 1/137* (2013.01); *G02F 1/133723* (2013.01); *G02F 1/133753* (2013.01); *G02F 1/1368* (2013.01); *G02F 1/133345* (2013.01); *G02F 1/133512* (2013.01); *G02F 1/133514* (2013.01); *G02F 1/134336* (2013.01); *G02F 1/136227* (2013.01); *G02F 1/136286* (2013.01); *G02F 2001/133357* (2013.01); *G02F 2001/133726* (2013.01); *G02F 2001/133742* (2013.01);
(Continued)

(58) Field of Classification Search
CPC ......... G02F 1/133788; G02F 1/133723; G02F 1/133753
USPC ....................................... 349/123
See application file for complete search history.

(56) References Cited

U.S. PATENT DOCUMENTS 6,633,356 B1 * 10/2003 Kataoka ............ G02F 1/133707
349/129
2005/0052399 A1 3/2005 Hattori et al.
(Continued)

FOREIGN PATENT DOCUMENTS

KR 1020150012093 2/2015

*Primary Examiner* — Lucy P Chien
(74) *Attorney, Agent, or Firm* — Cantor Colburn LLP

(57) ABSTRACT

A liquid crystal display device includes a first substrate including one surface, a second substrate including one surface and the other surface, a first alignment layer which is disposed on the one surface of the first substrate, includes a polymeric material, and has a first thickness, a first photocured layer disposed on the first alignment layer, a second alignment layer which is disposed on the one surface of the second substrate, and includes a polymeric material same as the polymeric material in the first alignment layer, and which has a second thickness less than the first thickness, a second photocured layer disposed on the second alignment layer, and a liquid crystal layer which includes first liquid crystal molecules and second liquid crystal molecules further vertically aligned than the first liquid crystal molecules in an initial aligned state.

16 Claims, 16 Drawing Sheets

(51) Int. Cl.
  *G02F 1/1335* (2006.01)
  *G02F 1/1337* (2006.01)
  *G02F 1/1343* (2006.01)
  G02F 1/1362 (2006.01)
  G02F 1/1368 (2006.01)

(52) U.S. Cl.
  CPC ............ *G02F 2001/133761* (2013.01); *G02F 2001/134345* (2013.01); *G02F 2201/121* (2013.01); *G02F 2201/123* (2013.01); *G02F 2201/56* (2013.01); *G02F 2203/04* (2013.01)

(56) References Cited

U.S. PATENT DOCUMENTS

| | | | |
|---|---|---|---|
| 2006/0170852 A1* | 8/2006 | Lee | G02F 1/133711 349/123 |
| 2011/0019131 A1* | 1/2011 | Oki | G02B 5/3033 349/75 |
| 2012/0092603 A1* | 4/2012 | Mizusaki | C08F 20/20 349/129 |
| 2015/0241741 A1* | 8/2015 | Lee | G02F 1/133753 349/96 |

* cited by examiner

LIQUID CRYSTAL DISPLAY DEVICE AND METHOD FOR MANUFACTURING THE SAME

This application claims priority to Korean Patent Application No. 10-2015-0153862, filed on Nov. 3, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device and a method for manufacturing the LCD device.

2. Description of the Related Art

A liquid crystal display ("LCD") device is one of the currently most widely used flat panel display devices, and generally includes two substrates on which electric field generating electrodes such as pixel electrodes and a common electrode are formed, and a liquid crystal layer interposed between the substrates.

The LCD device applies voltages to the electric field generating electrodes so as to generate an electric field in the liquid crystal layer, which determines the alignment direction of liquid crystal molecules in the liquid crystal layer to control polarization of incident light, thereby displaying desired images.

A size of a screen increases as the LCD device is used as a display device of a television receiver, for example. As the size of the screen of the LCD device increases, viewing angles may vary depending on whether a viewer sees the center or left and right ends of the screen.

To compensate for a viewing angle difference, an LCD device can be formed into a curve type including a concave type and a convex type. The curved LCD device may be a portrait type of which vertical length is longer than the horizontal length (i.e., width) thereof and which is curved in a vertical direction, or a landscape type of which vertical length is shorter than the horizontal length thereof and which is curved in a horizontal direction.

SUMMARY

A misalignment may occur between an upper substrate and a lower substrate since a display panel is curved in a curved liquid crystal display ("LCD") device or a flexible LCD device. This may cause dark vertical stripes in a pixel region. Viewers may recognize these dark vertical stripes in a pixel region as specks, or a reddish phenomenon in which a color is displayed as being reddish may occur due to the dark vertical stripes. These problems can become severe when the curvature of the display panel increases.

Exemplary embodiments of the invention provide an LCD device with improved display quality.

Exemplary embodiments of the invention provide a method for manufacturing an LCD device with improved display quality.

However, embodiments of the invention are not restricted to those set forth herein. The other embodiments of the invention which are not described herein will become more apparent to a person skilled in the art to which the invention pertains by referencing the detailed description of the invention given below.

According to an exemplary embodiment of the invention, there is provided an LCD device. The LCD device comprising a first substrate including one surface, a second substrate including one surface and the other surface, the one surface of the second substrate facing the one surface of the first substrate, the other surface of the second substrate being a display surface from which light emits, a first alignment layer which is disposed on the one surface of the first substrate, and which includes a polymeric material, and which has a first thickness, a first photocured layer disposed on the first alignment layer, a second alignment layer which is disposed on the one surface of the second substrate, and which includes a polymeric material same as the polymeric material in the first alignment layer, and which has a second thickness less than the first thickness, a second photocured layer disposed on the second alignment layer, and a liquid crystal layer which is interposed between the first photocured layer and the second photocured layer and which includes first liquid crystal molecules adjacent to the first photocured layer and second liquid crystal molecules adjacent to the second photocured layer, wherein the second liquid crystal molecules are further vertically aligned than the first liquid crystal molecules in an initial aligned state.

In an exemplary embodiment, each of the first alignment layer and the second alignment layer may include polyimide, the polyimide including a main chain including an imide group in a repeating group thereof, and a side chain substituted with a vertical aligner and/or a polymer initiator, each of the first photocured layer and the second photocured layer being provided by polymerizing a photocuring agent.

In an exemplary embodiment, the photocuring agent may include reactive mesogens.

In an exemplary embodiment, each of the first photocured layer and the second photocured layer may include a plurality of mesogen polymers where the reactive mesogens are polymerized, and a size of the plurality of mesogen polymers in the first photocured layer may be larger than a size of the plurality of mesogen polymers in the second photocured layer.

In an exemplary embodiment, each of the first photocured layer and the second photocured layer may include a plurality of mesogen polymers where the reactive mesogens are polymerized, and a number of the plurality of mesogen polymers per unit area in the first photocured layer may be larger than a number of the plurality of mesogen polymers per unit area in the second photocured layer.

In an exemplary embodiment, a polymeric material included in the second alignment layer may be substantially the same as a polymeric material included in the first alignment layer.

In an exemplary embodiment, the first substrate may include a first base substrate and a pixel electrode disposed on the first base substrate, and the second substrate may include a second base substrate and a common electrode disposed on the second base substrate.

In an exemplary embodiment, the first substrate and the second substrate may be curved in the same direction such that the other surface of the second substrate may be concavely curved.

According to an exemplary embodiment of the invention, there is provided a method for manufacturing an LCD device comprising preparing a first substrate including one surface on which a first alignment layer having a first thickness and including a photocuring agent is provided, preparing a second substrate including one surface on which a second alignment layer including a material substantially same as a material of the first alignment layer, having a second thickness less than the first thickness, and including a photocuring agent is provided, interposing a liquid crystal layer between the first alignment layer and the second alignment layer, and irradiating light in a state where an electric field is applied to the liquid crystal layer such that the photocuring agent is polymerized to form a first photocured layer and a second photocured layer respectively on a surface of the first alignment layer and a surface of the second alignment layer.

In an exemplary embodiment, the preparing a first substrate including a first alignment layer disposed thereon may include providing a first aligning agent including a photocuring agent on the first substrate, and curing the first aligning agent to form the first alignment layer, and the preparing a second substrate including a second alignment layer disposed thereon may include providing a second aligning agent including a material substantially same as a material of the first aligning agent on the second substrate, and curing the second aligning agent to form the second alignment layer, wherein curing the second aligning agent may include a process condition same as a process condition of curing the first aligning agent.

In an exemplary embodiment, the second aligning agent may be a composition same as the first aligning agent.

In an exemplary embodiment, the curing the first aligning agent may include firstly curing the first aligning agent, and secondarily curing the firstly-cured first aligning agent under a process condition different from a process condition of the first curing of the first aligning agent, and the curing the second aligning agent may include firstly curing the second aligning agent, and secondarily curing the firstly-cured second aligning agent under a process condition different from a process condition of the first curing of the second aligning agent.

In an exemplary embodiment, the secondarily curing the first aligning agent may be performed at a higher temperature and for a longer time period than firstly curing the first aligning agent, and secondarily curing the second aligning agent may be performed at a higher temperature and for a longer time period than firstly curing the second aligning agent.

In an exemplary embodiment, the curing the first aligning agent may be performed simultaneously with curing the second aligning agent in the same chamber.

In an exemplary embodiment, at least a part of the photocuring agent in the first aligning agent may be lost in curing the first aligning agent, and at least a part of the photocuring agent in the second aligning agent may be lost in curing the second aligning agent.

In an exemplary embodiment, the photocuring agents in the first alignment layer and the second alignment layer may include reactive mesogens.

In an exemplary embodiment, each of the first photocured layer and the second photocured layer may include a plurality of mesogen polymers where the reactive mesogens are polymerized, and a size of the plurality of mesogen polymers in the first photocured layer may be larger than a size of the plurality of mesogen polymers in the second photocured layer.

In an exemplary embodiment, each of the first photocured layer and the second photocured layer may include a plurality of mesogen polymers where the reactive mesogens are polymerized, and a number of the plurality of mesogen polymers per unit area in the first photocured layer may be larger than a number of the plurality of mesogen polymers per unit area in the second photocured layer.

In an exemplary embodiment, interposing the liquid crystal layer may include providing a liquid crystal composition, and bonding the first substrate and the second substrate to each other, and irradiating light may be performed after bonding the first substrate and the second substrate to each other.

In an exemplary embodiment, the method may further comprise irradiating light in a state where no electric field is generated after irradiating light.

According to an exemplary embodiment of the invention, there is provided an LCD device in which liquid crystal molecules adjacent to an upper substrate are relatively vertically aligned when compared with liquid crystal molecules adjacent to a lower substrate, thereby improving light transmittance and minimizing a texture caused by a misalignment.

According to another exemplary embodiment of the invention, there is provided an LCD device in which pre-tilt angles of liquid crystal molecules adjacent to an upper substrate and liquid crystal molecules adjacent to a lower substrate are made different from each other without using different alignment layers on the upper substrate and the lower substrate, thereby providing ease of maintenance and management of an aligning agent composition for forming an alignment layer.

According to another exemplary embodiment of the invention, there is provided an LCD device in which pre-tilt angles of liquid crystal molecules adjacent to an upper substrate and liquid crystal molecules adjacent to a lower substrate are made different from each other even though aligning agents for the upper substrate and the lower substrate are cured under the same process condition, thereby simplifying processes and reducing costs.

According to another exemplary embodiment of the invention, there is provided an LCD device in which specks or a reddish phenomenon are alleviated, thereby improving reliability.

However, effects of the invention are not restricted to the exemplary embodiments set forth herein and more diverse effects are included in this description.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
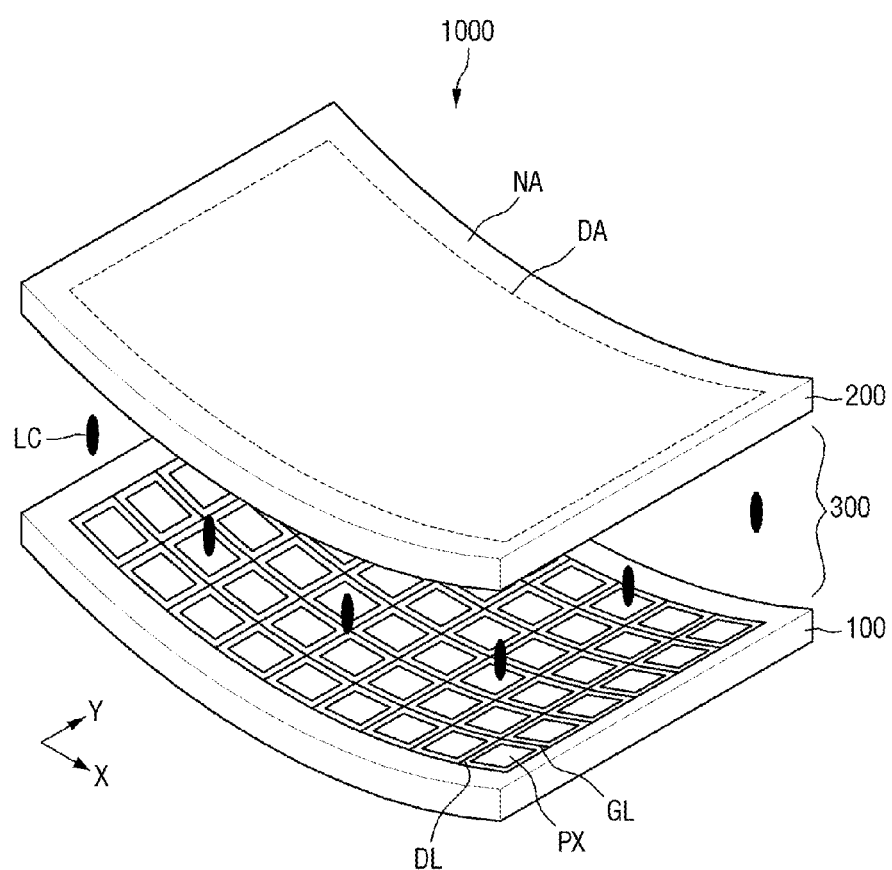
FIG. 1 is a schematic exploded perspective view of an exemplary embodiment of a liquid crystal display ("LCD") device according to the invention.

Features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described with reference to the attached drawings.

FIG. 1 is a schematic exploded perspective view of a liquid crystal display ("LCD") device according to an exemplary embodiment of the invention.

Referring to FIG. 1, an LCD device 1000 includes a first substrate 100 including one surface, a first alignment layer (not shown) and a first photocured layer (not shown) disposed on the one surface of the first substrate 100, a second substrate 200 including one surface facing the first substrate 100 and the other surface from which light is emitted, a second alignment layer (not shown) and a second photocured layer (not shown) disposed on the one surface of the second substrate 200, and a liquid crystal layer 300 interposed between the first substrate 100 and the second substrate 200. The first substrate 100 may be a lower display substrate and the second substrate 200 may be an upper display substrate, and the other surface of the second substrate 200 may be a display surface through which a viewer may view an image.

Each of the first substrate 100 and the second substrate 200 may include a display area DA and a non-display area NA. The display area DA displays an image and the non-display area NA does not display an image. The outer periphery of the display area DA is enclosed by the non-display area NA.

The display area DA may include a plurality of gate lines GLs extending in a first direction X (e.g., column direction), a plurality of data lines DLs extending in a second direction Y (e.g., row direction) intersecting the first direction X, and a plurality of pixels PXs provided in regions defined by the intersection between the gate lines GLs and data lines DLs. The plurality of pixels PXs may be arranged in the column direction and the row direction, substantially in a matrix.

Each of the pixel regions PXs may uniquely represent one of primary colors so as to realize color display. Examples of the primary colors may include a red color, a green color and a blue color.

The non-display area NA may be a light blocking area. A gate driving unit (not shown) for providing gate signals to the pixels PXs in the display area DA and a data driving unit (not shown) for providing data signals to the pixels PXs in the display area DA may be disposed in the non-display area NA of the LCD device. The gate lines GLs and the data lines DLs may be extended from the display area DA to the non-display area NA and electrically connected to each of the driving units.

A backlight unit (not shown) may be disposed below the first substrate 100 so as to emit light from below the display panel including the first substrate 100 and the second substrate 200. The backlight unit may include a light source (not shown), a light guide plate (not shown) which enables light incident from the light source to be incident to the display panel, a reflection sheet (not shown) disposed below the light guide plate, and one or more optical sheets (not shown) disposed on the light guide plate so as to improve luminance characteristics of light advancing toward the display panel.

As shown in FIG. 1, the first substrate 100 and the second substrate 200 of the LCD device 1000 according to an exemplary embodiment of the invention may be curved at least in the first direction X in a plan view, and the LCD device 1000 may be a curved LCD device in which the one surface of the first substrate 100 and/or the other surface (display surface) of the second substrate 200 are concavely curved. For the sake of convenience in explanation, the curved LCD device of the illustrated exemplary embodiment will be depicted as a flat panel LCD device in the cross-sectionals view below.

Pixels of the LCD device according to an exemplary embodiment of the invention will now be described in detail.

Figure 2:
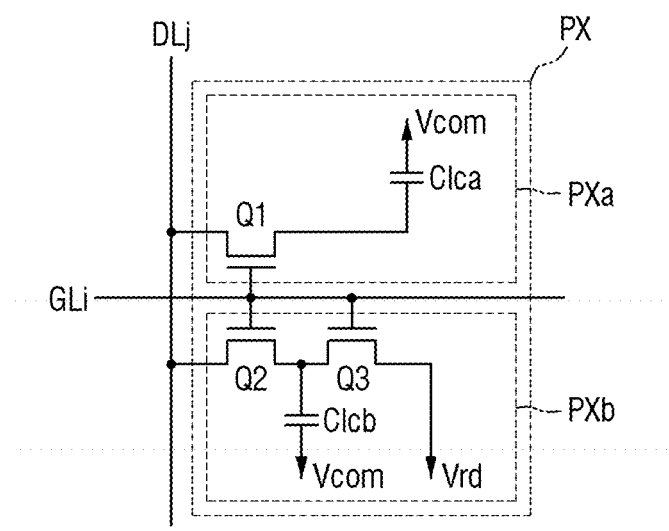
FIG. 2 is an equivalent circuit diagram illustrating one pixel of FIG. 1.

FIG. 2 is an equivalent circuit diagram illustrating one pixel of FIG. 1.

Referring to FIG. 2, one pixel PX may be connected to a corresponding gate line GLi, a data line DLj and a reference voltage line (not shown). The pixel PX may receive a data signal and a reference voltage Vrd provided respectively from the data line DLj and the reference voltage line in response to the gate signal provided through the gate line GLi. The reference voltage Vrd may be, for example, a voltage such as a common voltage Vcom, or a voltage having the same polarity as that of a data voltage with respect to the common voltage Vcom, and i and j are integers larger than zero.

The pixel PX may include a first switching element Q1, a second switching element Q2, a third switching element Q3, a first liquid crystal capacitor Clca and a second liquid crystal capacitor Clcb. Each of the first and second liquid crystal capacitors Clca and Clcb may include one terminal which is a pixel electrode described later and the other terminal which is a common electrode to which the common voltage Vcom is applied, and a liquid crystal layer, as dielectrics, interposed between the pixel electrode and the common electrode. In exemplary embodiments, the pixel PX may further include a storage capacitor. The terminals of the first, the second and the third switching elements Q1, Q2 and Q3 and the first and second liquid crystal capacitors Clca and Clcb will be described in detail later.

An operation of the pixel PX in one frame period will now be described.

When a gate signal is applied to the gate line GLi, the first, the second and the third switching elements Q1, Q2 and Q3 connected to the gate line GLi are turned on.

Thus, the data voltage provided from the data line DLj may be applied to a first subpixel electrode which is one electrode of the first liquid crystal capacitor Clca through the turned-on first switching element Q1. In this case, the first liquid crystal capacitor Clca may be charged with a voltage difference between the data voltage and the common voltage Vcom. The first liquid crystal capacitor Clca may be charged with a voltage relatively larger than that of the second liquid crystal capacitor Clcb described later so as to control liquid crystals. Throughout the description, the pixel region defined by the first liquid crystal capacitor Clca is referred to as a first subpixel PXa or a high-pixel.

The turned-on second and third switching elements Q2 and Q3 may electrically interconnect an input terminal of the second switching element Q2 and an output terminal of the third switching element Q3. In this case, the data voltage provided from the data line DLj may be applied to the input terminal of the second switching element Q2, and the reference voltage Vrd having a magnitude smaller than the magnitude of the data voltage may be applied to the output terminal of the third switching element Q3, with the result that a predetermined voltage having a magnitude between those of the data voltage and the reference voltage Vrd may be applied to a second subpixel electrode which is one electrode of the second liquid crystal capacitor Clcb. Therefore, the second liquid crystal capacitor Clcb may be charged with a voltage difference between a predetermined voltage smaller than the data voltage and the common voltage Vcom, and the second liquid crystal capacitor Clcb may be charged with a voltage relatively smaller than that of the first liquid crystal capacitor Clca so as to control liquid crystals. Throughout the description, the pixel region defined by the second liquid crystal capacitor Clcb is referred to as a second subpixel PXb or a low-pixel.

The high-pixel charged with a relatively higher voltage may lead to a poor side visibility in a low grey level where liquid crystals are vertically aligned, and the low-pixel charged with a relatively lower voltage may lead to a poor side visibility in an intermediate grey level and a high grey level where liquid crystals are close to a vertical alignment. That is, the voltages charged in the first and second liquid crystal capacitor Clca and Clcb may represent gamma curves different from each other, and the gamma curve for one pixel voltage perceived by a viewer may be a combination of the two gamma curves. Image data may be converted such that a front synthesis gamma curve may conform to a front reference gamma curve determined as being most suitable and a side synthesis gamma curve may become closest to the front reference gamma curve, thereby further improving side visibility.

Hereinafter, components of the pixel and an arrangement thereof will be described in detail.

Figure 3:
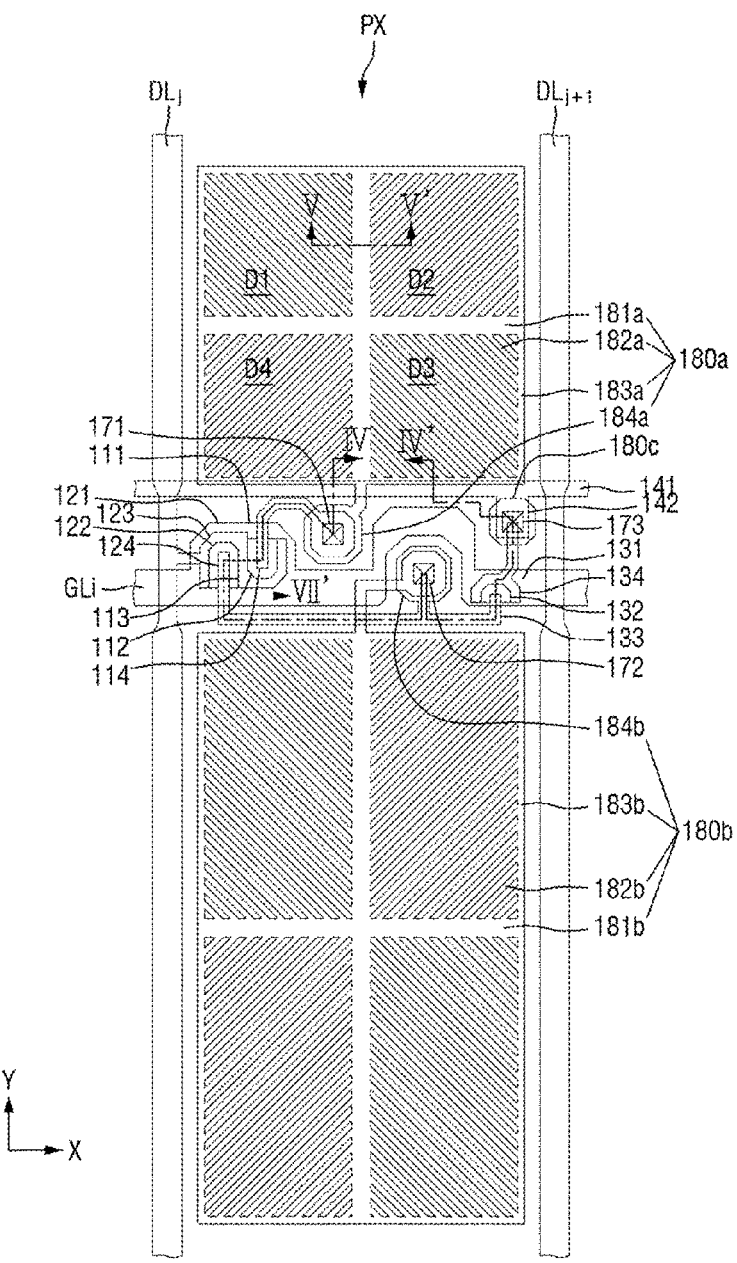
FIG. 3 is a plan view illustrating one pixel of FIG. 1.
Figure 4:
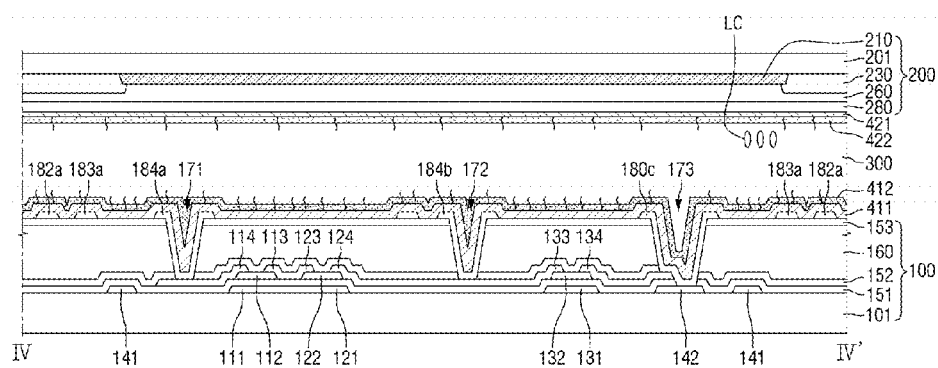
FIG. 4 is a cross-sectional view taken along line IV-IV' of FIG. 3.

FIG. 3 is a plan view illustrating one pixel of FIG. 1. FIG. 4 is a cross-sectional view taken along line IV-IV' of FIG. 3.

Referring to FIGS. 3 and 4, the first substrate 100 may include a first base substrate 101, a plurality of thin film transistors ("TFTs"), pixel electrodes 180a and 180b, a plurality of protective layers/insulation layers, etc.

The first base substrate 101 may be a transparent insulation substrate and may include a material excellent in transmittance, heat resistance, chemical resistance and the like. In an exemplary embodiment, the first base substrate 101 may be a silicon substrate, a glass substrate, a plastic substrate or the like, for example.

A gate wiring layer may be disposed on the first base substrate 101. The gate wiring layer may include the gate line GLi, a plurality of gate electrodes and a reference voltage line 141.

The gate line GLi may extend substantially in the first direction X. A first gate electrode 111 and a second gate electrode 121 may protrude upwardly from the gate line GLi, and the first gate electrode 111 and the second gate electrode 121 may be unitary with each other without a physical boundary therebetween. Specifically, the first gate electrode 111 may be positioned further to the right than the second gate electrode 121. Furthermore, a third gate electrode 131 may be disposed in a region overlapped with the extended gate line GLi. That is, the first, the second and the third gate electrodes 111, 121 and 131 may be physically connected to the same gate line GLi such that the same gate signal may be applied to the first, the second and the third gate electrodes 111, 121 and 131.

The reference voltage line 141 may be provided in the same layer as the gate line GLi and the gate electrodes, and may extend substantially in parallel to the gate line GLi. A reference voltage may be applied to the reference voltage line 141.

The reference voltage line 141 may include a reference voltage electrode 142. The reference voltage electrode 142 may protrude downwardly from the reference voltage line 141 to have a wide surface so as to provide a space for a stable contact with a third drain electrode 134. Unlike those shown in FIGS. 3 and 4, the reference voltage line may further include a sustain electrode and/or a sustain electrode line in exemplary embodiments. In this case, the sustain electrode is protruded from the reference voltage line and may cooperate with a data wiring layer overlapped on the sustain electrode and a plurality of passivation layers/insulation layers interposed between the sustain electrode and the data wiring layer so as to constitute a storage capacitor. Furthermore, the sustain electrode line may be protruded from the reference voltage line and disposed along an edge of the pixel electrode such that the sustain electrode line is overlapped with at least a part of a rim electrode unit of the pixel electrode. However, the invention is not limited thereto, and the sustain electrode and/or the sustain electrode line may be omitted or the shape and arrangement thereof may be modified in another embodiment.

In an exemplary embodiment, the gate wiring line may be provided by forming a first metal layer including tantalum (Ta), tungsten (W), titanium (Ti), molybdenum (Mo), aluminum (Al), copper (Cu), silver (Ag), chrome (Cr) and neodymium (Ne) or any alloy material or a compound material including the element as a main component, for example, and by patterning the first metal layer. The patterning may be performed through a mask process or other processes for forming a pattern.

A gate insulation layer 151 may be disposed on the gate wiring layer all over the whole surface of the first base substrate 101. The gate insulation layer 151 may include an insulating material so as to achieve electrical insulation between layers disposed on and beneath the gate insulation layer 151. In an exemplary embodiment, the gate insulation layer 151 may include a material such as silicon nitride (SiNx), silicon oxide (SiOx), silicon nitride oxide (SiNxOy), silicon oxynitride (SiOxNy) or any combination thereof, and may have a multi-layer structure including two insulation layers having different physical properties, for example.

A semiconductor material layer including a first semiconductor layer 112, a second semiconductor layer 122 and a third semiconductor layer 132 may be disposed on the gate insulation layer 151. The first semiconductor layer 112, the second semiconductor layer 122 and the third semiconductor layer 132 may be disposed respectively in regions overlapped with the first, the second and the third gate electrodes 111, 121 and 131. In an exemplary embodiment, the semiconductor material layer may include a semiconductor material such as amorphous silicon, polycrystalline silicon and oxide semiconductor. Each of the semiconductor layers may serve as a channel of a TFT so as to be turned on or off depending on the voltage supplied to the gate electrode.

A data wiring layer may be disposed on the semiconductor layer. The data wiring layer may include one or more data lines DLj and DLj+1, a plurality of source electrodes and a plurality of drain electrodes.

The data line DLj may extend substantially in the second direction X2 and intersect the gate line GLi. A data signal may be applied to the data line DLj. The data line DLj and the gate line GLi may intersect each other, thereby defining the pixel region PX. The plurality of pixel regions PXs may operate independently from each other by a plurality of TFTs connected by the gate line GLi and data line DLj corresponding thereto.

The first source electrode 113 and the first drain electrode 114 may be spaced apart from each other on the first gate electrode 111 and the first semiconductor layer 112, the second source electrode 123 and the second drain electrode 124 may be spaced apart from each other on the second gate electrode 121 and the second semiconductor layer 122, and the third source electrode 133 and the third drain electrode 134 may be spaced apart from each other on the third gate electrode 131 and the third semiconductor layer 132. Specifically, the first and second source electrodes 113 and 123 may enclose respectively at least a part of the first and second drain electrodes 114 and 124, and the third drain electrode 134 may enclose at least a part of the third source electrode 133. In an exemplary embodiment, each of the first and second source electrodes 113 and 123 and the third drain electrode 134 may have a C, U, inverse C or inverse U shape in a plan view, for example. The first and second source electrodes 113 and 123 may be unitary with each other without a physical boundary therebetween, and protruded rightwardly from the data line DLj. The third source electrode 133 may be physically connected to the second drain electrode 124. The first drain electrode 114 may be electrically connected to the first subpixel electrode 180a through a first contact hole 171, the second drain electrode 124 may be electrically connected to the second subpixel electrode 180b through a second contact hole 172, and the third drain electrode 134 may be electrically connected to the reference voltage electrode 142 through a third contact hole 173 and a contact electrode 180c.

In an exemplary embodiment, the data wiring layer may be provided by forming a second metal layer including refractory metal such as silver (Ag), gold (Au), copper (Cu), nickel (Ni), platinum (Pt), palladium (Pd), iridium (Ir), rhodium (Rh), tungsten (W), aluminum (Al), tantalum (Ta), molybdenum (Mo), cadmium (Cd), zinc (Zn), iron (Fe), titanium (Ti), silicon (Si), germanium (Ge), zirconium (Zr) and barium (Ba), any alloy thereof or metal nitride thereof, and patterning the second metal layer.

Although not shown in the drawings, an ohmic contact layer (not shown) may be interposed between the semiconductor layer and the data wiring layer. In an exemplary embodiment, the ohmic contact layer may include an n+ hydrated amorphous silicon material which is highly doped with n-type impurities, or may include silicide, for example.

An insulation layer including a first passivation layer 152, a planarizing layer 160 and a second passivation layer 153 may be disposed on the data wiring layer all over the whole surface of the first base substrate 101. The insulation layer may include an organic layer and/or an inorganic layer, and in exemplary embodiments, each of the passivation layers and the planarizing layer may have a multi-layer structure.

In an exemplary embodiment, the first passivation layer 152 may include an inorganic insulation material such as silicon nitride or silicon oxide. The first passivation layer 152 may prevent the wirings and electrodes disposed therebelow from directly contacting an organic material. The planarizing layer 160 may be disposed on the first passivation layer 152. The planarizing layer 160 may include an organic material. The planarizing layer 160 may enable a plurality of components stacked on the first base substrate 101 to have a uniform height. The second passivation layer 153 may be disposed on the planarizing layer 160. The second passivation layer 153 may prevent the liquid crystal layer 300 from being contaminated by an organic material leak out from the planarizing layer 160, thereby preventing defects such as afterimage which might otherwise occur during an operation of a screen of an LCD device.

A contact hole may be defined in the insulation layer including the first passivation layer 152, the planarizing layer 160 and the second passivation layer 153 so as to expose a part of the first, the second and the third drain electrodes 114, 124 and 134 and the reference voltage electrode 142. Specifically, the first contact hole 171 may expose a part of the first drain electrode 114, the second contact hole 172 may expose a part of the second drain electrode 124, and the third contact hole 173 may expose a part of the third drain electrode 134 and the reference voltage electrode 142.

The pixel electrode including the first subpixel electrode 180a and the second subpixel electrode 180b and the contact electrode 180c may be disposed on the second passivation layer 153 and in the region exposed by the first, the second and the third contact holes 172, 172 and 173. The contact electrode 180c may be overlapped with the third contact hole 173 so as to enable the reference voltage electrode 142 and the third drain electrode 134 exposed by the third contact hole 173 to contact each other. The contact electrode 180c may include a material same as those of the first and second subpixel electrodes 180a and 180b through an integrated process.

Pixel electrodes may be disposed to correspond to the respective pixel regions PXs, and may occupy the most part of the area of the pixel regions PXs in a plan view. Furthermore, the pixel electrodes may cooperate with a common electrode 280 disposed on the second substrate 200 so as to control the alignment direction of the liquid crystal molecules LCs in the liquid crystal layer 300 interposed between the first substrate and the second substrate. The pixel electrodes may be transparent electrodes. In an exemplary embodiment, the transparent electrodes may include materials such as indium tin oxide, indium zinc oxide or a combination thereof, but the invention is not limited thereto. The pixel electrodes may include the first subpixel electrode 180a and the second subpixel electrode 180b spaced apart from each other in the second direction Y.

The first subpixel electrode 180a may have a substantially quadrangular shape as a whole, and may be a pattern electrode in which a slit pattern is defined. Specifically, the first subpixel electrode 180a may include a first center electrode 181a, a plurality of first branched finger electrodes 182a extending from the first center electrode 181a, a first connection electrode 183a provided at a rim portion of the first subpixel electrode 180a so as to interconnect the plurality of first branched finger electrodes 182a, and a first protruded electrode 184a protruding from the first connection electrode 183a.

In an exemplary embodiment, the first center electrode 181a may have a substantially cross shape, and the first branched finger electrodes 182a may radially extend in the direction inclined from the cross-shaped first center electrode 181a, for example, in the direction of approximately 45°. Thus, the first subpixel electrode 180a may have four domains which are divided by the first center electrode 181a and in which the respective first branched finger electrodes 182a have different directivities. Throughout the description, the domains are referred to as first to fourth domains D1 to D4 in a clockwise direction starting from a left upper domain. The domains D1 to D4 may function as a director of liquid crystal molecules LCs so as to provide domains in which alignment directions of the liquid crystal molecules LCs are different from each other during an operation of an LCD device. Thus, liquid crystal controllability may be improved, viewing angle may be increased, texture may be reduced and transmittance and response speed may be improved.

At least parts of the radially extending first branched finger electrodes 182a may be interconnected through the first connection electrode 183a that interconnects ends of the first branched finger electrodes 182a. Furthermore, the first protruded electrode 184a having a wide area may be provided in a lower portion of the first subpixel electrode 180a in a plan view so as to stably contact the first drain electrode 114 through the first contact hole 171. In an exemplary embodiment, the first subpixel electrode 180a may correspond to a high-pixel.

The second subpixel electrode 180b may include a second center electrode 181b, a plurality of second branched finger electrodes 182b extending from the second center electrode 181b, a second connection electrode 183b provided at a rim portion of the second subpixel electrode 180b so as to interconnect the plurality of second branched finger electrodes 182b, and a second protruded electrode 184b protruding from the second connection electrode 183b, and may have a shape and components substantially the same as those of the first subpixel electrode 180a as a whole. However, the second subpixel electrode 180b may have a rectangular shape of which vertical length is longer than the horizontal length thereof, and may have an area larger than that of the first subpixel electrode 180a in a plan view. In an exemplary embodiment, an area ratio of the first subpixel electrode 180a and the second subpixel electrode 180b in a plan view may be approximately 1:2 to 1:10, for example.

The second protruded electrode 184b having a wide area may be provided in an upper portion of the second subpixel electrode 180b in a plan view so as to stably contact the second drain electrode 124 through the second contact hole 172. In an exemplary embodiment, the second subpixel electrode 180b may correspond to a low-pixel.

However, such shapes of the first and second subpixel electrodes 180a and 180b are merely an example, and in exemplary embodiments, the first and second subpixel electrodes 180a and 180b may be arranged to be bent with respect to the gate lines and data lines, or may be modified into various shapes of branched finger electrodes, or only one pixel electrode may be provided in one pixel region.

A first alignment layer 411 and a first photocured layer 412 may be disposed on the whole surface of the first substrate 100 including the first base substrate 101, a plurality of TFTs, pixel electrodes 180a and 180b and a plurality of passivation layers/insulation layers. The first alignment layer 411 and the first photocured layer 412 will be described in detail later with reference to FIG. 5.

The second substrate 200 may include a second base substrate 201, a light blocking member 210, a color filter 230, an overcoat layer 260, a common electrode 280, etc.

The second base substrate 201 may be a transparent insulation substrate like the first base substrate 101. The light blocking member 210 may be disposed on the second base substrate 201. In an exemplary embodiment, the light blocking member 210 may be, for example, a black matrix. The light blocking member 210 may be disposed in a boundary region between the plurality of pixel regions PXs, that is, in a region overlapped with the data lines DLj and DLj+1 and in a region overlapped with the first to third switching elements and the gate line GLi, and may suppress defects such as undesired color combinations or light leakage which might occur in the boundary between the pixel regions PXs defined by the light blocking member 210.

The color filter 230 may be disposed on the light blocking member 210 such that the color filter 230 may overlap at least a part of the pixel region PX. The color filter 230 may selectively transmit light in a specific wavelength range. The color filter 230 may be interposed between the two neighboring data lines DLj and DLj+1, and color filters which transmit light in different wavelength ranges may be disposed in the respective pixel regions PXs adjacent each other. In an exemplary embodiment, a red color filter may be disposed in a first pixel region, and a green color filter may be disposed in a second pixel region adjacent to the first pixel region, for example. Although the color filter 230 is depicted as being disposed on the second substrate 200 in FIG. 4, other exemplary embodiments may have a color filter on array structure in which a color filter is disposed on a TFT of a first substrate.

The overcoat layer 260 may be disposed on the light blocking member 210 and the color filter 230 all over the whole surface of the second base substrate 201. The overcoat layer 260 may prevent a misalignment of the light blocking member 210, that is, prevent the light blocking member 210 from escaping from the second base substrate 201, may suppress afterimage caused by the particles of a pigment discharged from the color filter 230, and may enable components stacked on the second base substrate 201 to have a uniform height.

The common electrode 280 may be disposed on the overcoat layer 260. The common electrode 280 may be a transparent electrode like the pixel electrode. The common electrode 280 may be disposed to overlap with the most part of each of pixel regions PXs.

A second alignment layer 421 and a second photocured layer 422 may be disposed on the whole surface of the second substrate 200 including the second base substrate 201, the light blocking member 210, the color filter 230, the overcoat layer 260, and the common electrode 280.

Hereinafter, the alignment layers and the photocured layers according to an exemplary embodiment of the invention will be described in detail.

Figure 5:
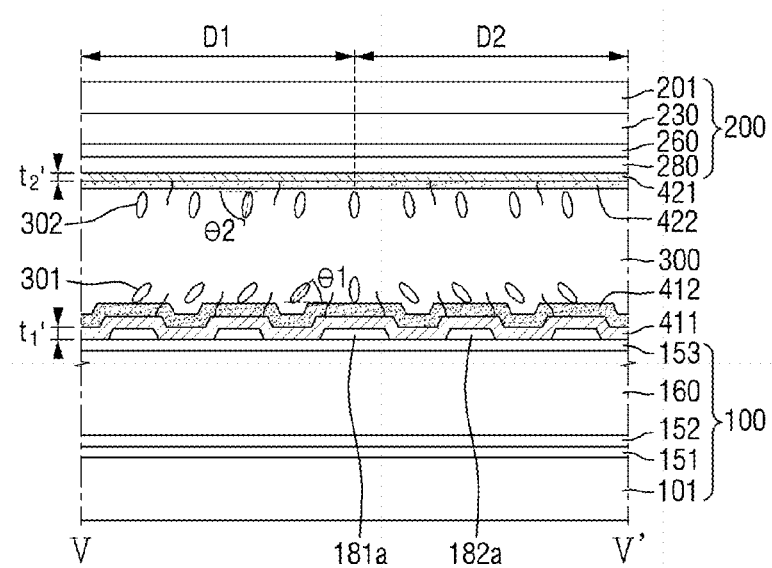
FIG. 5 is a cross-sectional view taken along line V-V' of FIG. 3.

FIG. 5 is a cross-sectional view taken along line V-V' of FIG. 3. FIG. 5 schematically illustrates an alignment of liquid crystal molecules in an initial stage where no electrical field is applied to the LCD device.

Referring to FIG. 5, the first alignment layer of the first substrate 100 may include the first alignment layer 411 having a predetermined thickness $t_1'$ and the first photocured layer 412 disposed on the first alignment layer 411. In an exemplary embodiment, the first alignment layer may be a vertically aligned layer, for example.

In an exemplary embodiment, the first alignment layer 411 may be a vertically aligned alignment layer including a polymeric material, for example, polyimide, including a main chain with a repeating unit including therein an imide group (—CONHCO—) and a side chain to which a vertical aligner is introduced, the vertical aligner being at least one among an alkyl group, hydrocarbon derivatives including a terminal substituted with an alkyl group, hydrocarbon derivatives including a terminal substituted with a cycloalkyl group, and hydrocarbon derivatives including a terminal substituted with aromatic hydrocarbon, for example. The liquid crystal molecules LCs in the liquid crystal layer 300 may be vertically aligned by the vertical aligner in the first alignment layer 411.

At least a part of the side chain of the polyimide of the first alignment layer 411 may further include a side chain substituted with a polymerization initiator in addition to the vertical aligner. In an exemplary embodiment, the polymerization initiator may be a photopolymerization initiator, for example. In this case, the photopolymerization initiator absorbs ultraviolet ("UV") rays so as to be decomposed into radicals and promote polymerization. The higher the concentration of the polymerization initiator, the density of mesogen polymers increases, which will be discussed later.

In an exemplary embodiment, the polymerization initiator may be one of acetophenone, benzoin, benzophenone, diethoxy acetophenone, phenyletone, thioxanthone, 2-hydroxy-2-methyl-1-phenylpropane-1-on, benzyl-dimethyltar, 4-(2-hydroxy ethoxy)phenyl-(2-hydroxy)-2-propyl ketone, 1-hydroxycyclohexyl phenyl ketone, o-benzoyl benzoic acid methyl, 4-phenyl benzophenone, 4-benzoyl-4'-methyl-diphenyl sulfides, (4-benzoyl benzyl) trimethyl ammonium chlorides, bis(2,4,6-trimethyl benzoyl)-phenyl phosphine oxide, diphenyl(2,4,6-trimethyl benzoyl)-phosphine oxide, 2-hydroxy methyl propion nitrile, 2,2'-{asobis (2-methyl-N-[1,1'-bis(hydroxymethyl)-2-hydroxyethyl) propion amide], acrylic acid [(2-methoxy-2-phenyl-2-benzoyl)-ethyl] ester, phenyl 2-acryloyloxy-2-propyl ketone, phenyl 2-methacryloyloxy-2-propyl ketone, 4-isopropylphenyl 2-acryloyloxy-2-propyl ketone, 4-chlorophenyl 2-acryloyloxy-2-propyl ketone, 4-dodecyl phenyl 2-acryloyloxy-2-propyl ketone, 4-methoxyphenyl 2-acryloyloxy-2-propyl ketone, 4-acryloyloxy phenyl 2-hydroxy-2-propyl ketone, 4-methacryloyloxy phenyl 2-hydroxy-2-propyl ketone, 4-(2-acryloyloxy ethoxy)-phenyl 2-hydroxy-2-propyl ketone, 4-(2-acryloyloxy diethoxy)-phenyl 2-hydroxy-2-propyl ketone, 4-(2-acryloyloxy ethoxy)-benzoin, 4-(2-acryloyloxy ethylthio)-phenyl 2-hydroxy-2-propyl ketone, 4-N,N'-bis-(2-acryloyloxy ethyl)-aminophenyl 2-hydroxy-2-propyl ketone, 4-acryloyloxy phenyl 2-acryloyloxy-2-propyl ketone, 4-methacryloyloxy phenyl 2-methacryloyloxy-2-propyl ketone, 4-(2-acryloyloxy ethoxy)-phenyl 2-acryloyloxy-2-propyl ketone, 4-(2-acryloyloxy diethoxy)-phenyl 2-acryloyloxy-2-propyl ketone, dibenzylketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acylphosphine) and α-aminoketone or any combination thereof, for example. However, the polymerization initiator is not limited thereto.

In exemplary embodiments, at least a part of the side chain of polyimide of the first alignment layer 411 may be substituted with an ion scavenger (ion capture agent) in addition to the vertical aligner and polymerization initiator. In an exemplary embodiment, the ion scavenger may be a cation scavenger or an anion scavenger, for example. The ion scavenger may capture ion impurities in the liquid crystal layer 300 so as to improve voltage holding ratio.

The first photocured layer 412 may be at least partially disposed on the first alignment layer 411. In an exemplary embodiment, the first photocured layer 412 may include a polymeric compound in which monomolecules including a photocuring agent are polymerized with each other or chemically bonded to the vertical aligner in the first alignment layer 411, and the polymeric compound formed into a shape of micro protuberances coves the whole surface of the first alignment layer 411. In an exemplary embodiment, the photocuring agent may be reactive mesogen, and the polymeric compound may be a polymer of reactive mesogen, for example. In an exemplary embodiment, the reactive mesogen may be a compound which includes a mesogen group (or a mesogen structure) for expressing liquid crystal properties and includes a polymerizable terminal group for polymerization, and may mean crosslinkable low molecules or macromolecules, and may cause chemical reactions such as polymerization upon absorption of light and/or heat of a specific wavelength. Examples of the mesogen group may include cyclohexyl, biphenyl, terphenyl, naphthalene and the like, and examples of the polymerization terminal group may include (meth)acrylate, vinyl, vinyloxy, epoxy and the like. In an exemplary embodiment, the reactive mesogen may have a rod type, banana type, board type or a disk type structure, for example. The mesogen polymers of the first photocured layer 412 may be cured with a predetermined slope, and the first photocured layer 412 may give an influence on an alignment of liquid crystal molecules by an interaction force between the reactive mesogen polymers and adjacent liquid crystal molecules and/or a physical force.

Similarly, the second alignment layer of the second substrate 200 may include the second alignment layer 421 having a second thickness $t_2'$ less than the thickness $t_1'$ of the first alignment layer 411, and the second photocured layer 422 disposed on the second alignment layer 421, and the second alignment layer may also be vertically aligned.

In an exemplary embodiment, the second alignment layer 421 may include a polymeric material substantially the same as that of the first alignment layer 411, that is, polyimide in which at least a part of the side chain is substituted with a vertical aligner, a polymerization initiator and/or an ion scavenger and which includes an imide group in a repeating unit of the main chain. In an exemplary embodiment, the first alignment layer 411 and the second alignment layer 421 may include the completely same polymeric material or may include at least the same polymeric material.

The second photocured layer 422 may be at least partially disposed on the second alignment layer 421. The second photocured layer 422 may also include a compound substantially the same as that of the first photocured layer 412, that is, a polymeric compound in which monomolecules including substantially the same as photocuring agent of the first photocured layer 412 are polymerized with each other or chemically bonded to the vertical aligner in the second alignment layer 421, the polymeric compound being provided into a shape of micro protuberances covering the whole surface of the second alignment layer 421. However, the size of the micro protuberances (i.e., mesogen polymers) forming the second photocured layer 422 and/or the number of the micro protuberances (i.e., mesogen polymers) per unit area (i.e., density) forming the second photocured layer 422 may be smaller than the size of the micro protuberances forming the first photocured layer 412 and/or less than the number of micro protuberances per unit area forming the first photocured layer 412. This may mean that the degree of polymerization, content per unit area, or an absolute amount of the polymeric compound of the second photocured layer 422 may be less than those of the polymeric compound of the first photocured layer 412. Furthermore, the vertical aligner and polymeric compounds of the second alignment layer 421 constituting the second photocured layer 422 may be cured with a slope the same as or smaller than that of the vertical aligner and polymeric compounds of the first photocured layer 412.

The liquid crystal layer 300 may include first liquid crystal molecules 301 adjacent to a surface of the first photocured layer 412, and second liquid crystal molecules 302 adjacent to a surface of the second photocured layer 422. Since the first and second photocured layers 412 and 422 are cured with a predetermined slope, the first and second liquid crystal molecules 301 and 302 aligned by the first and second photocured layers 412 and 422 may maintain a pre-tilt angle in an initial aligned state. Resultantly, the liquid crystal molecules may tilt in a pre-tilt direction when electric fields are generated to drive an LCD device, thereby improving response speed of the LCD device. Throughout the description, the initial aligned state may mean the state where no electric field is generated between the first substrate and the second substrate or the state where the substantially same voltage is applied to the first substrate and the second substrate, and the pre-tilt angle may mean the size of an acute angle provided by a major axis of liquid crystal molecules with respect to a virtual tangent on a surface of the first substrate or the second substrate. In an exemplary embodiment, when liquid crystal molecules are completely vertically aligned with respect to the surface of the first substrate or the second substrate, the liquid crystal molecules may have a pre-tilt angle of about 90°, for example.

Specifically, the first liquid crystal molecules 301 adjacent to the first photocured layer 412 may be aligned substantially with a first pre-tilt angle ($\theta 1$), and the second liquid crystal molecules 302 adjacent to the second photocured layer 422 may be aligned substantially with a second pre-tilt angle ($\theta 2$) larger than the first pre-tilt angle ($\theta 1$). That is, the second liquid crystal molecules 302 adjacent to the second substrate 200 may be further vertically aligned than the first liquid crystal molecules 301 adjacent to the first substrate 100. In an exemplary embodiment, the second pre-tilt angle ($\theta 2$) may be larger than the first pre-tilt angle ($\theta 1$) by at least 1°, for example.

This is because since the size and/or density of the mesogen polymers of the first photocured layer 412 are larger than the size and/or density of the mesogen polymers of the second photocured layer 422, an interaction force between the mesogen polymers and liquid crystal molecules or a physical force for forming a pre-tilt in the first and second liquid crystal molecules 301 and 302 respectively adjacent to the first and second photocured layers 412 and 422 may be larger between the first photocured layer 412 and the first liquid crystal molecules 301, or the mesogen polymers of the second photocured layer 422 may be cured with a slope smaller than that of the mesogen polymers of the first photocured layer 412.

In an initial state where no electric field is applied to an LCD device, a predetermined pre-tilt may be provided in the first liquid crystal molecules 301 adjacent to the surface of the lower substrate and a larger pre-tilt or the substantially vertically alignment may be provided in the second liquid crystal molecules 302 adjacent to the surface of the upper substrate, thereby improving specks or darkness caused by a collision between alignment directions of the first and second liquid crystal molecules 301 and 302.

Liquid crystal molecules provided in the first domain D1 and liquid crystal molecules provided in the second domain D2 may have different pre-tilt directions. In an exemplary embodiment, liquid crystal molecules provided in the first domain D1 may be aligned by being tilted in a right downward direction in the plan view of FIG. 3 (right side of the cross-sectional view of FIG. 5), while liquid crystal molecules provided in the second domain D2 and having a size substantially the same as that of the corresponding liquid crystal molecules in the first domain D1 may be aligned by being tilted in the different direction, that is, in a left downward direction in the plan view of FIG. 3 (left side of the cross-sectional view of FIG. 5). As described above, domains may be provided in which liquid crystal molecules are aligned in different directions so as to improve viewing angle and response speed.

A method for manufacturing the LCD device according to an exemplary embodiment of the invention will now be described.

Figure 6:
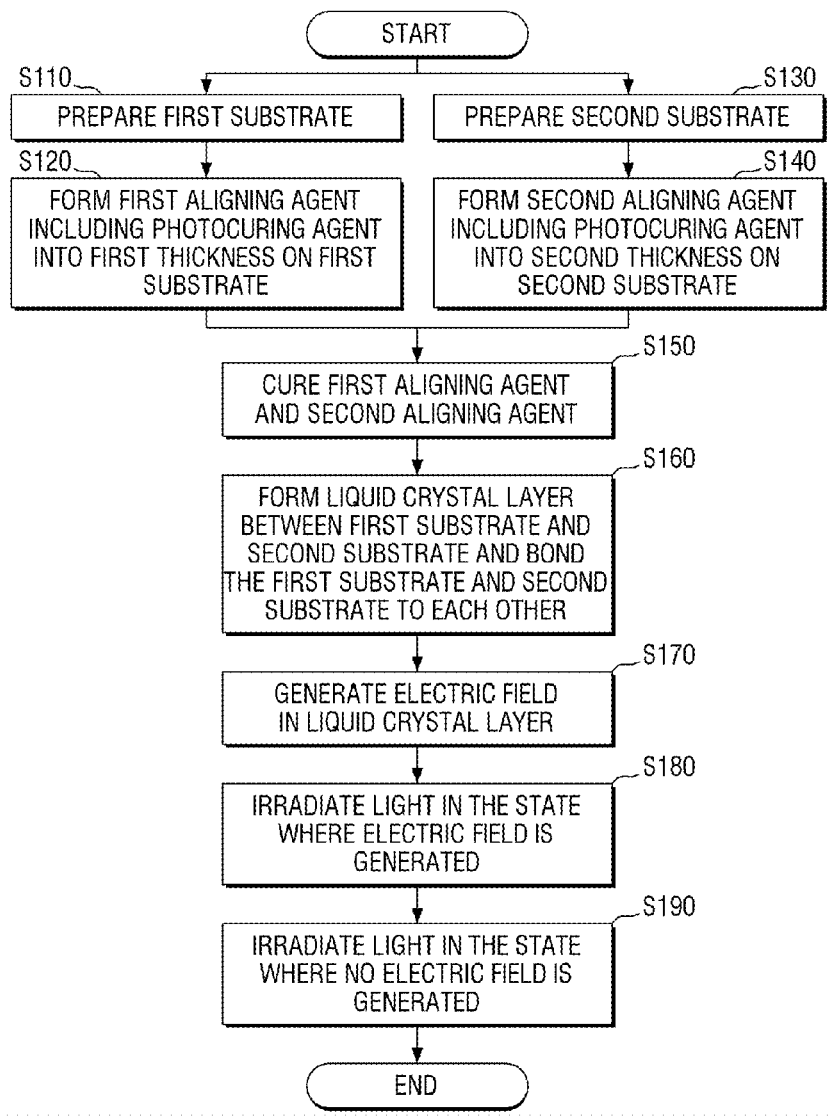
FIG. 6 is a flowchart illustrating an exemplary embodiment of processes of manufacturing the LCD device according to the invention.

FIG. 6 is a flowchart illustrating processes of manufacturing the LCD device according to an exemplary embodiment of the invention. FIGS. 7 to 13 are cross-sectional views illustrating operations of the manufacturing process of FIG. 6.

Figure 7:
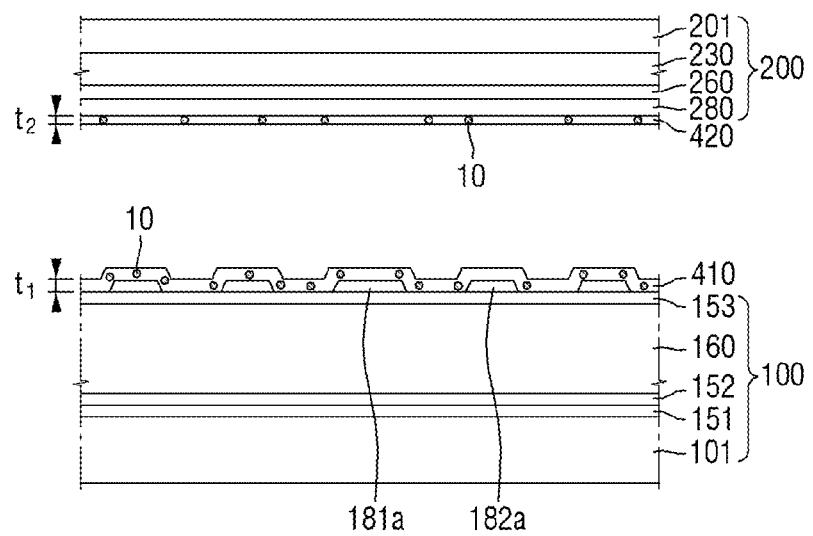
FIGS. 7 to 13 are cross-sectional views illustrating operations of the manufacturing process of FIG. 6.

Referring to FIGS. 6 and 7, a gate wiring layer (not shown), the gate insulation layer 151, a data wiring layer (not shown), first and second passivation layers 152 and 153, the planarizing layer 160 and pixel electrodes 181a and 182a may be disposed on the first base substrate 101 so as to prepare a first substrate (S110). Subsequently, the light blocking member 210, the color filter 230, the overcoat layer 260 and the common electrode 280 may be disposed on the second base substrate 201 so as to prepare a second substrate (S130). The first substrate 100 may be a lower display substrate and the second substrate 200 may be an upper display substrate. The arrangement and shape of components of the first and second substrates have been described above with reference to FIGS. 3 to 5, and thus detailed descriptions thereof will be omitted.

Subsequently, a first aligning agent 410 may have a first thickness $t_1$ on the first substrate (S120). The first aligning agent 410 may be provided through a process of depositing an aligning agent composition on the substrate. In an exemplary embodiment, the process may include a spin coating process, a slit coating process and the like, for example, but the invention is not limited thereto. The aligning agent composition of the first aligning agent 410 may include polyimide having a main chain with a repeating group including an imide group, and a side chain substituted with a vertical aligner, a polymerization initiator and/or an ion scavenger, a photocuring agent 10, and a predetermined solvent.

Subsequently, a second aligning agent 420 may have a second thickness $t_2$ less than the first thickness $t_1$ on the second substrate (S140). The second aligning agent 420 may be provided through a process of depositing an aligning agent composition on the substrate. The aligning agent composition of the second aligning agent 420 may include a material substantially the same as that of the aligning agent composition of the first aligning agent 410. In an exemplary embodiment, the aligning agent composition of the second aligning agent 420 may be the same as the aligning agent composition of the first aligning agent 410, that is, the aligning agent composition of the second aligning agent 420 may include, by the same composition ratio, a polyimide compound and the photocuring agent 10 same as those of the aligning agent composition of the first aligning agent 410, for example.

In this case, although the relative composition ratio and concentration of the photocuring agent 10 and polyimide included in the first aligning agent 410 and the second aligning agent 420 may be the same, the amount of the first aligning agent 410 deposited into the first thickness $t_1$ may be larger than the amount of the second aligning agent 420 deposited into the second thickness $t_2$, and thus the absolute amount of the photocuring agent 10 included in the first aligning agent 410 may be larger than the amount of the photocuring agent 10 included in the second aligning agent 420. Furthermore, since the amount of polyimide included in the first aligning agent 410 may be larger than the amount of polyimide included in the second aligning agent 420, the content of the polymerization initiator introduced to the side chain of the polyimide may also be higher in the first aligning agent 410.

Figure 8:
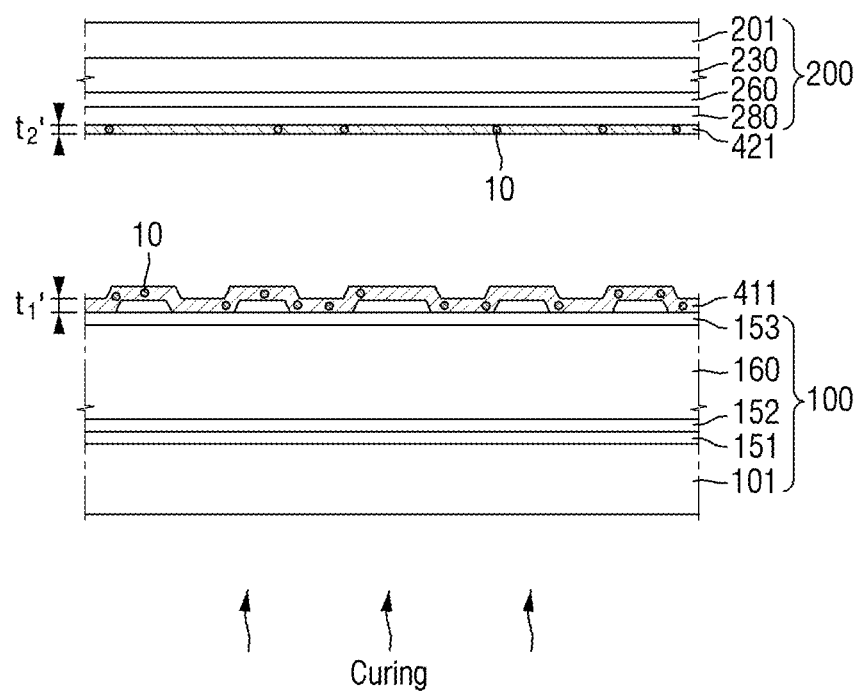
Figure 9:
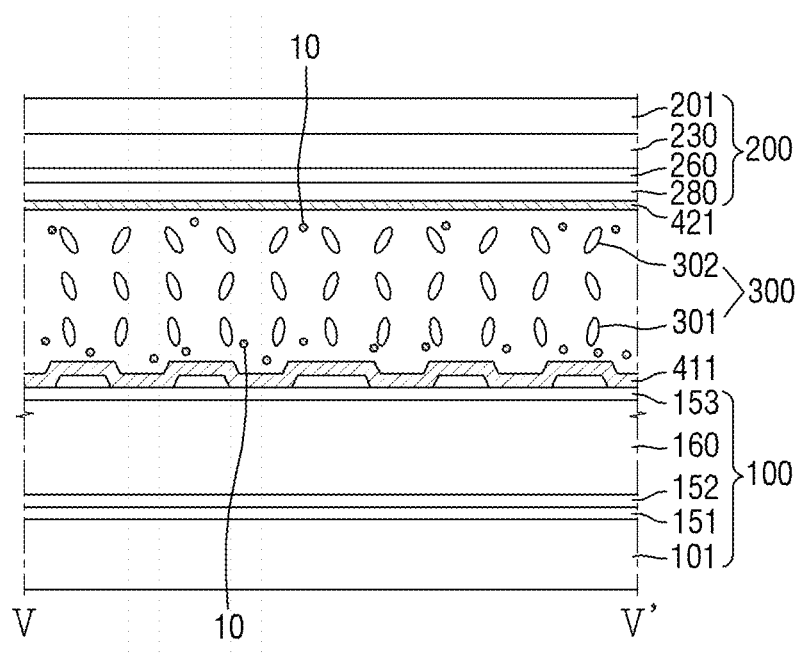
Figure 10:
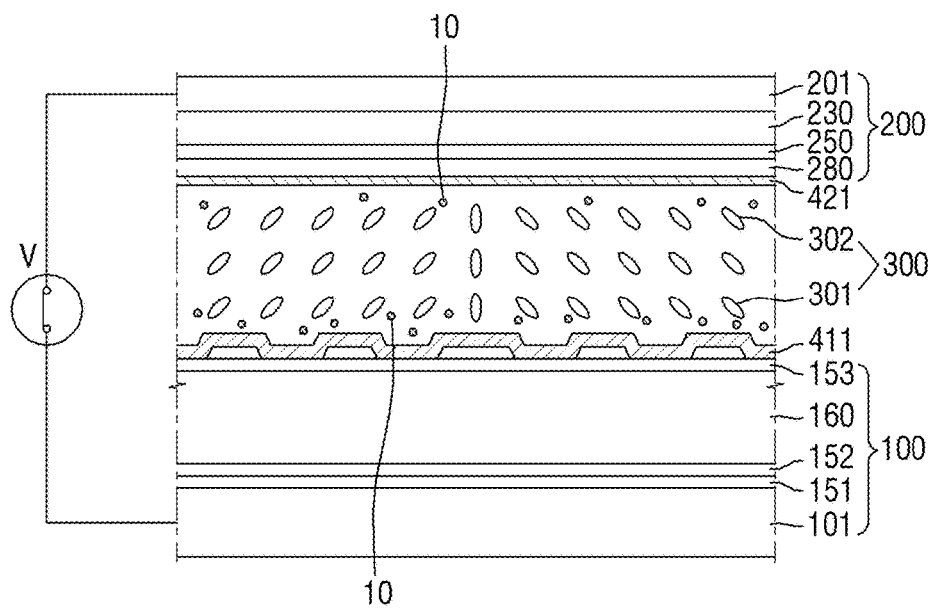
Figure 11:
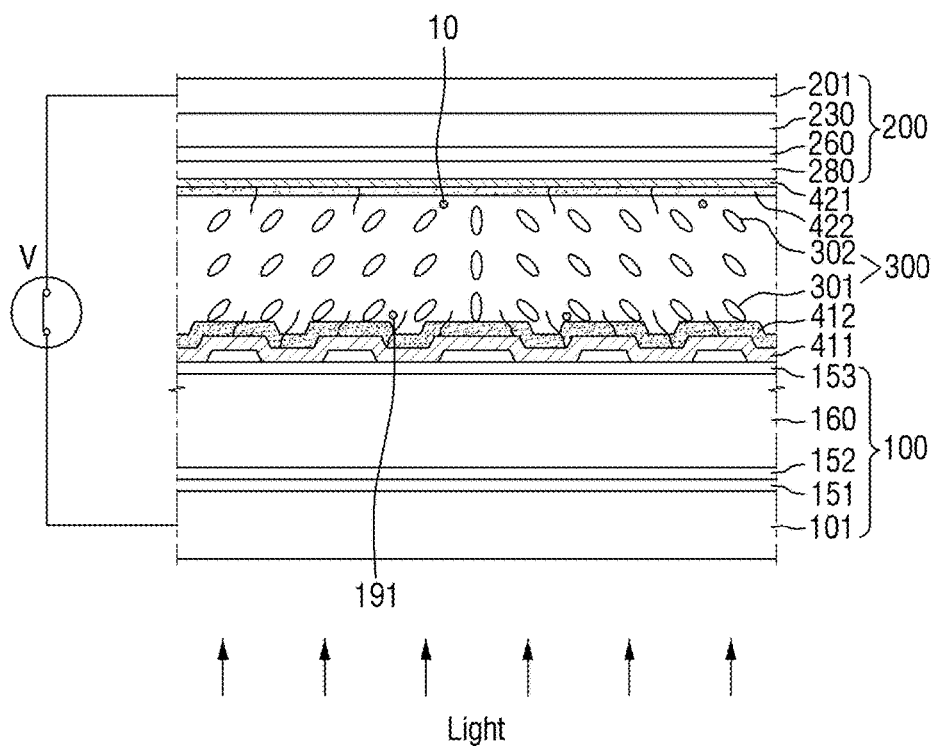

Referring to FIGS. 6 to 8, the first aligning agent 410 disposed on the first substrate and the second aligning agent 420 disposed on the second substrate may be cured (S150). The operation of curing the first aligning agent 410 and the second aligning agent 420 may include one or more heat treating process. In an exemplary embodiment, the operation (S150) of curing the first aligning agent and the second aligning agent may include an operation of firstly curing the first and second aligning agents (hereinafter, referred to as a primary curing operation), and an operation of secondly curing the first and second aligning agents (hereinafter, referred to as a secondary curing operation), for example.

The primary curing operation may be a pre-curing operation, and the secondary curing operation may be a main curing operation or a post-curing operation. In an exemplary embodiment, the primary curing operation and the secondary curing operation of the operation (S150) of curing the first aligning agent and the second aligning agent may be sequentially performed, but in exemplary embodiments, the primary curing operation and the secondary curing operation may be substantially consecutively performed without a separation of the operations.

The primary curing operation may remove the solvent included in the aligning agent. In an exemplary embodiment, the curing temperature may be approximately 50 degrees Celsius (° C.) to approximately 100° C., or approximately 60° C. to approximately 75° C. in the primary curing operation, for example. In an exemplary embodiment, the primary curing operation may be performed for approximately 60 seconds to approximately 300 seconds, or approximately 70 seconds to approximately 120 seconds, for example.

The secondary curing operation may substantially finish the polymerization of polymer monomers or polymer precursors included in the first and second aligning agents 410 and 420. The secondary curing operation may be performed at a higher temperature and for a longer time period than the primary curing operation. In an exemplary embodiment, the curing temperature may be approximately 150° C. to approximately 270° C., or approximately 170° C. to approximately 230° C. in the secondary curing operation, for example. In an exemplary embodiment, the secondary curing operation may be performed for approximately 500 seconds to approximately 1500 seconds, or approximately 700 seconds to approximately 1300 seconds, for example.

The method for manufacturing the LCD device according to an exemplary embodiment of the invention may include the operation (S150) of curing the first aligning agent and the second aligning agent, in which process conditions (e.g., curing temperature, curing time period and the like) of the operation of firstly curing the first aligning agent 410 on the first substrate may be substantially the same as those of the operation of firstly curing the second aligning agent 420 on the second substrate, and process conditions of the operation of secondly curing the first aligning agent 410 may be substantially the same as those of the operation of secondly curing the second aligning agent 420. In an exemplary embodiment, the first aligning agent 410 and the second aligning agent 420 may be simultaneously firstly cured through a single process, or simultaneously firstly cured in the same chamber, and the first aligning agent 410 and the second aligning agent 420 may be simultaneously secondly cured through a single process, or simultaneously secondly cured in the same chamber.

In the operation (S150) of curing the first aligning agent and the second aligning agent, the first aligning agent 410 may form the first alignment layer 411 including the photocuring agent 10 and the second aligning agent 420 may form the second alignment layer 421 including the photocuring agent 10. Specifically, at least a part of the solvent included in the aligning agents may be removed such that the first aligning agent 410 may form the first alignment layer 411 having a third thickness $t_1'$ and the second aligning agent 420 may form the second alignment layer 421 having a fourth thickness $t_2'$ less than the third thickness $t_1'$.

When the first aligning agent 410 and the second aligning agent 420 may include the same material, the polyimide compound remaining in the first alignment layer 411 and the polyimide compound remaining in the second alignment layer 421 may be substantially the same. That is, each of the first and second aligned layers 411 and 421 may be a vertically aligned layer including polyimide having a main chain with a repeating unit including therein an imide group (—CONHCO—) and a side chain to which a vertical aligner is introduced, the vertical aligner being at least one among an alkyl group, hydrocarbon derivatives including a terminal substituted with an alkyl group, hydrocarbon derivatives including a terminal substituted with a cycloalkyl group, and hydrocarbon derivatives including a terminal substituted with aromatic hydrocarbon, for example. Furthermore, at least a part of side chains of polyimides of the first and second alignment layers 411 and 421 may further include a polymerization initiator and/or an ion scavenger in addition to the vertical aligner.

In the operation (S150) of curing the first aligning agent and the second aligning agent, at least a part of the photocuring agent 10 included in the first aligning agent 410 and the photocuring agent 10 included in the second aligning agent 420 may be lost or disappear through thermal polymerization. As described above, since the absolute amount of the photocuring agent 10 included in the first aligning agent 410 may be larger than the amount of the photocuring agent 10 included in the second aligning agent 420, the amount of the photocuring agent 10 included in the first alignment layer 411 may still be larger than the amount of the photocuring agent 10 included in the second alignment layer 421 even after a part of the photocuring agent 10 has been lost or disappeared.

The first alignment layer 411 and the second alignment layer 421 have been described above with reference to FIGS. 3 to 5, and thus detailed descriptions thereof will be omitted.

Referring to FIGS. 6 to 9, the liquid crystal layer 300 is interposed between the first substrate on which the first alignment layer 411 is provided and the second substrate on which the second alignment layer 421 is provided, and the two substrates are bonded to each other (S160). In this case, the two substrates can be bonded to each other after a liquid crystal composition is provided through a liquid crystal dispensing process, but a liquid crystal injection process can be used after bonding the two substrates.

Liquid crystal molecules in the liquid crystal layer 300 may include the first liquid crystal molecules 301 adjacent to a surface of the first alignment layer 411 and second liquid crystal molecules 302 adjacent to a surface of the second alignment layer 421. In an initial state where no electric field is applied to an LCD device, liquid crystal molecules, specifically the first liquid crystal molecules 301 and the second liquid crystal molecules 303 may be substantially vertically aligned by the respective vertical aligners of the first and second alignment layers 411 and 421. At least a part of the photocuring agent 10 included in the first alignment layer 411 may be discharged into the liquid crystal layer 300 and located in the vicinity of the first substrate 100, and at least a part of the photocuring agent 10 included in the second alignment layer 421 may be discharged into the liquid crystal layer 300 and located in the vicinity of the second substrate 200.

Although not shown in the drawings, in exemplary embodiments, an annealing process may further be performed after formation of a liquid crystal layer so as to improve disperability and uniformity of liquid crystal molecules and promote discharge of the photocuring agent 10 included in the alignment layer.

Referring to FIGS. 6 to 10, an electric field may be generated between the first substrate and the second substrate of the LCD device (S170). In an exemplary embodiment, when the liquid crystal molecules in the liquid crystal layer 300 have negative dielectric anisotropy, the major axis of the liquid crystal molecules may tilt in the direction vertical to the electric field when the electric field is applied to the liquid crystal layer 300. Specifically, as the liquid crystal molecules become tilted, the vertical aligners and polymerization initiators introduced to side chains of polyimides of the first and second alignment layers 411 and 421 may tilt at the slope similar to those of the first and second liquid crystal molecules 301 and 302.

Referring to FIGS. 6 to 11, a light irradiation is performed in the state where the electric field is generated (S180). In an exemplary embodiment, the light may be UV rays, for example. Although light is depicted as being irradiated from the first substrate 100 side in FIG. 11, the light may be irradiated from the second substrate 200 side or from both substrate sides. When light is irradiated to the liquid crystal layer 300 including the photocuring agent 10, photopolymerization may be induced by the polymerization initiator introduced to the side chains of polyimides in the first and second alignment layers 411 and 421 so as to form the first photocured layer 412 at least partially on the first alignment layer 411 and the second photocured layer 422 at least partially on the second alignment layer 421.

In an exemplary embodiment, the photocuring agent 10 may be, for example, reactive mesogen, and the first and second photo-curable layers 412 and 422 may include mesogen polymers (i.e., polymeric compounds) in which reactive mesogens are polymerized with each other or chemically bonded to the vertical aligners in the alignment layers, the mesogen polymers being provided into a shape of micro protuberances covering the whole surfaces of the first and second alignment layers 411 and 421.

However, the size of the micro protuberances forming the second photocured layer 422 and the number of the micro protuberances per unit area forming the second photocured layer 422 may be smaller than the size of the micro protuberances forming the first photocured layer 412 and less than the number of micro protuberances per unit area forming the first photocured layer 412. Furthermore, the vertical aligner and mesogen polymers of the second alignment layer 421 constituting the second photocured layer 422 may be cured with a slope the same as or smaller than that of the vertical aligner and mesogen compounds of the first photocured layer 412. This may be because the amount of the photocuring agent 10 included in the first alignment layer 411, that is the amount of reactive mesogen monomer, may be larger than the amount of the photocuring agent 10 included in the second alignment layer 421, and thus the degree of polymerization may be higher in the first alignment layer 411. Alternatively, this may be because the content of the polymerization initiator introduced to the side chain of polyimide in the first alignment layer 411 may be more than the content of the polymerization initiator introduced to the side chain of polyimide in the second alignment layer 421, and thus the degree of polymerization may be higher in the first alignment layer 411.

Figure 12:
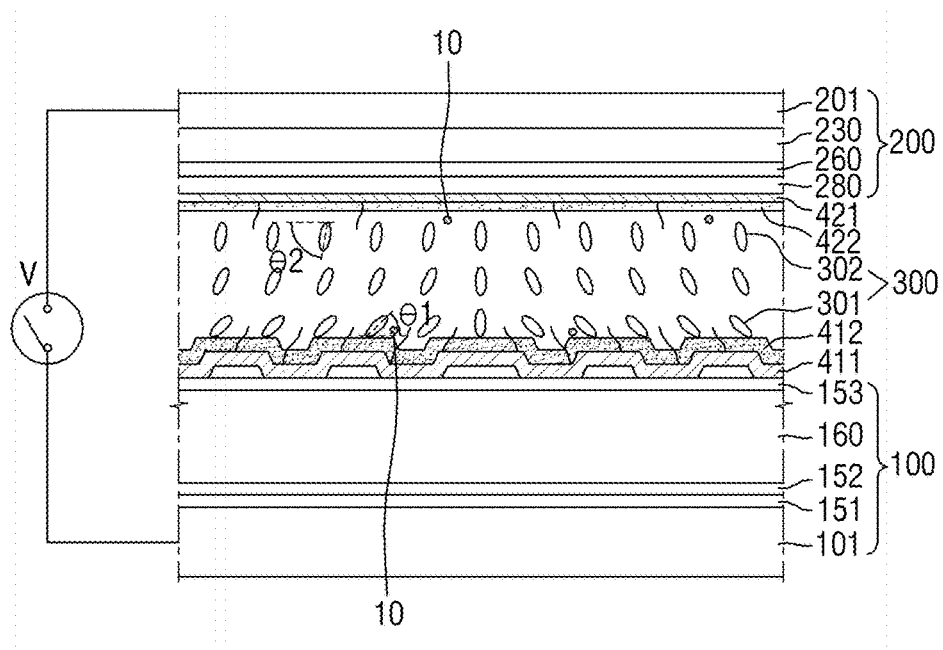
Figure 13:
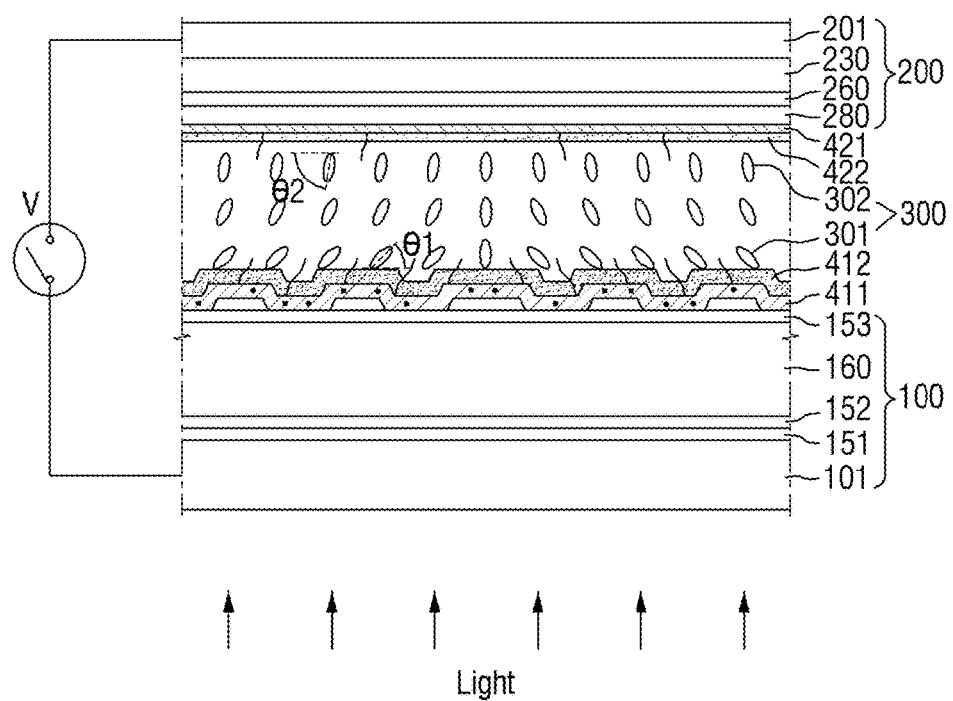

FIG. 12 illustrates that the first and second liquid crystal molecules 301 and 302 maintain respective pre-tilt angles even when the alignment directions of the first and second liquid crystal molecules 301 and 302 are fixed or stabilized by the tilted first and second photocured layers 412 and 422 and no electric field is generated. In this case, the pre-tilt angle of the first liquid crystal molecules 301 and the pre-tilt angle of the second liquid crystal molecules 302 may be different from each other. That is, in the state where no electric field is generated, the first liquid crystal molecules 301 may have the first pre-tilt angle ($\theta1$) and the second liquid crystal molecules 302 may have the second pre-tilt angle ($\theta2$) larger than the first pre-tilt angle ($\theta1$), and thus the second liquid crystal molecules 302 may be further vertically aligned than the first liquid crystal molecules 301.

This may be because since the force of the mesogen polymers forming the first photocured layer 412 affecting the first liquid crystal molecules 301 may be larger than the force of the mesogen polymers forming the second photocured layer 422 affecting the second liquid crystal molecules 302, the second liquid crystal molecules 302 may tend to return to a vertically aligned state while the first liquid crystal molecules 301 maintain the slope same as those of mesogen polymers. Alternatively, this may be because since the mesogen polymers forming the second photocured layer 422 may be cured with a slope smaller than that of the mesogen polymers forming the first photocured layer 412, the first and second liquid crystal molecules 301 and 302 may also have respective slopes corresponding thereto.

Referring to FIGS. 6 to 13, light is irradiate once more in the state where no electric field is generated so as to remove the photocuring agent 10 remaining in the liquid crystal layer 300 (S190). In this case, the second liquid crystal molecules 302 may be maintained at a further vertically aligned state than the first liquid crystal molecules 301 in the liquid crystal layer 300.

Subsequently, although not shown in the drawing, a curved LCD can be manufactured through the process of bending both ends of each of the first and second substrates 100 and 200 and the process of providing a backlight unit (not shown) below the first substrate.

The method for manufacturing an LCD device according to the illustrated exemplary embodiment may use a liquid crystal composition which does not include a photocuring agent, thereby reducing manufacturing costs. Specifically, the method according to the illustrated exemplary embodiment may use the second aligning agent composition which is substantially the same as the first aligning agent composition, thus allowing for ease of production, maintenance, management and storage of the aligning agent composition for forming an alignment layer, and enabling the composition of the first aligning agent and the composition of the second aligning agent to be the same. Furthermore, although the first aligning agent and the second aligning agent may be cured under the same process condition, the upper substrate and the lower substrate may have pre-tilt angles different from each other, thereby reducing manufacturing costs, unifying process facility and improving processability.

Figure 14A:
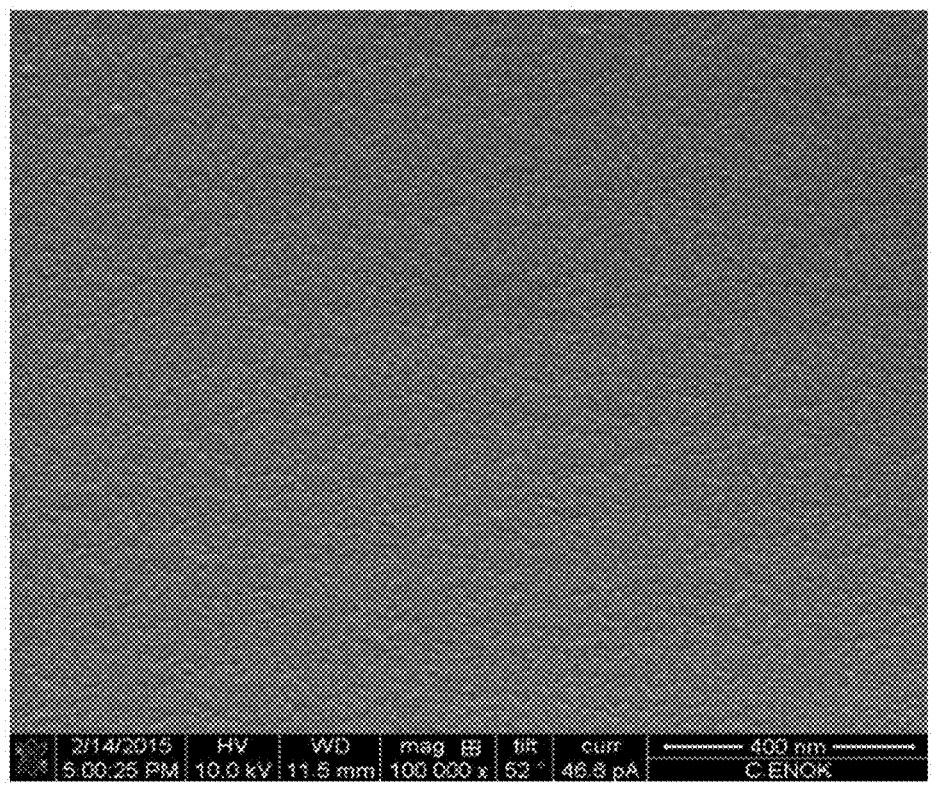
FIGS. 14A and 14B are photomicrographs of a surface of a photocured layer according to a deposition thickness of an aligning agent.
Figure 14B:
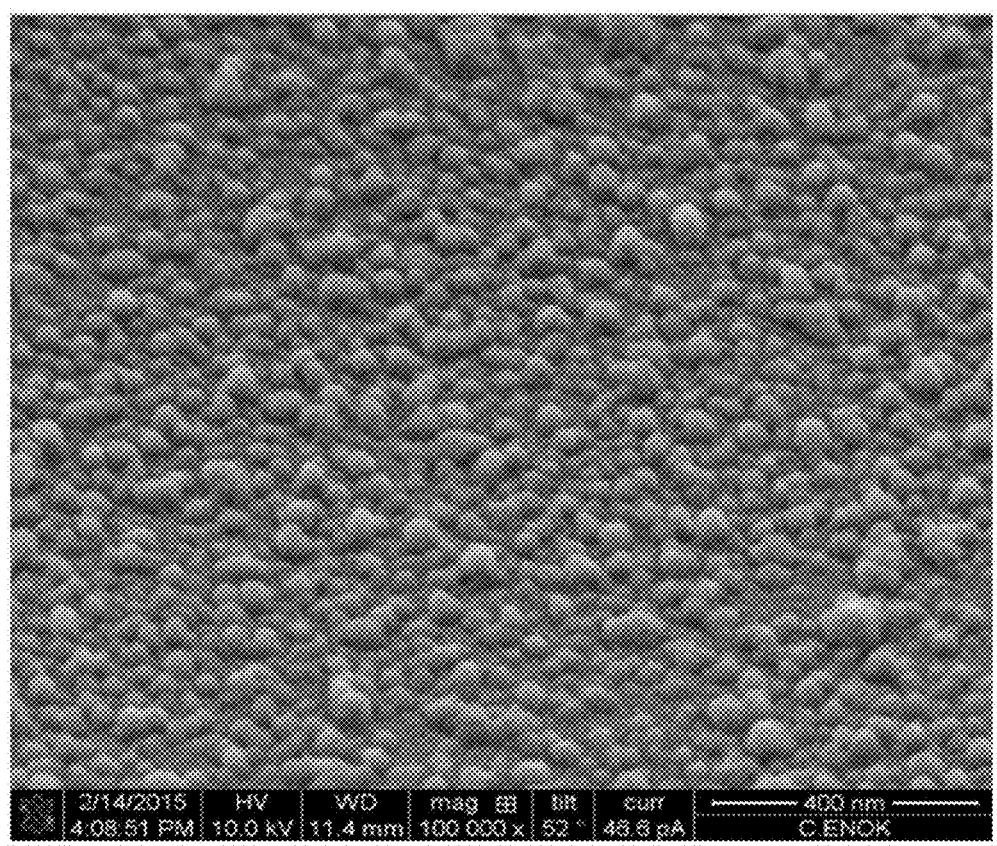

FIGS. 14A and 14B are photomicrographs of a surface of a photocured layer according to a deposition thickness of an aligning agent. Specifically, FIG. 14A is a photomicrograph of the surface of the photocured layer when an alignment film including an alignment layer and the photocured layer has a thickness of about 600 angstroms (Å) after a primary cure, and FIG. 14B is a photomicrograph of the surface of the photocured layer when an alignment film including an alignment layer and the photocured layer has a thickness of about 900 Å after a primary cure. That is, FIG. 14B is a photomicrograph showing a deposition thickness of an aligning agent thicker than that of FIG. 14A.

Referring to FIGS. 14A and 14B, the size and the number of protuberances (mesogen polymers) per unit area on the surface of the photocured layer where the aligning agent is provided relatively thicker (refer to FIG. 14B) may be larger than those of protuberances on the surface of the photocured layer where the aligning agent is provided relatively thinner (refer to FIG. 14A).

This may be because when the deposition thickness of the aligning agent is thicker, the absolute amount of reactive mesogen monomers included in the aligning agent may be larger and the size and the number of the mesogen polymers per unit area provided by polymerizing the reactive mesogen monomers may also be larger.

Figure 15:
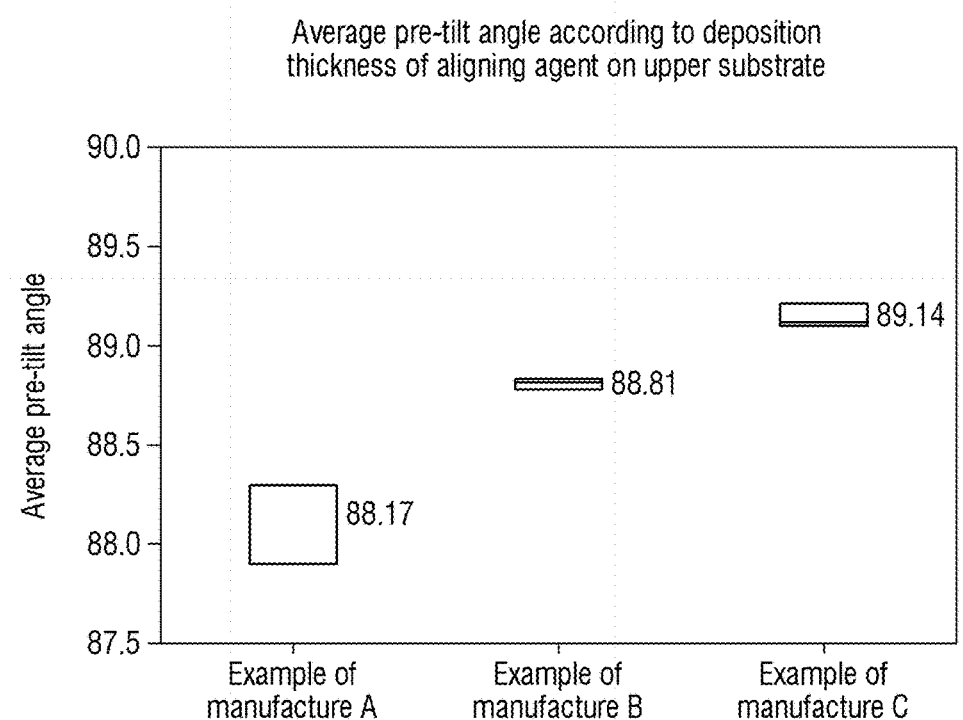
FIG. 15 illustrates the result of a measurement of an average pre-tilt angle according to a deposition thickness of an aligning agent.

FIG. 15 illustrates the result of a measurement of an average pre-tilt angle according to a deposition thickness of an aligning agent. Referring to FIG. 15, example of manufacture A shows when the alignment film on the lower substrate has a thickness of about 750 Å and the alignment film on the upper substrate has a thickness of about 900 Å after the primary cure, example of manufacture B shows when both the alignment film on the lower substrate and the alignment film on the upper substrate have a thickness of about 750 Å after the primary cure, and example of manufacture C shows when the alignment film on the lower substrate has a thickness of about 750 Å and the alignment film on the upper substrate has a thickness of about 600 Å after the primary cure. That is, FIG. 15 illustrates the result of a measurement of an average pre-tilt angle according to the deposition thickness of the aligning agent on the upper substrate when the aligning agent is deposited into the same thickness on the lower substrate and different thickness on the upper substrate.

Referring to FIG. 15, the average pre-tilt angle of liquid crystal molecules in a liquid crystal layer is about 88.17° in example of manufacture A, the average pre-tilt angle of liquid crystal molecules in a liquid crystal layer is about 88.81° in example of manufacture B, and the average pre-tilt angle of liquid crystal molecules in a liquid crystal layer is about 89.14° in example of manufacture C. That is, when the deposition thickness of the aligning agent on the upper substrate is less, the average pre-tilt angle of liquid crystal molecules in a liquid crystal layer is larger, that is, closer to a vertical alignment.

Although the pre-tilt angles of liquid crystal molecules adjacent to the lower substrate are the same in examples of manufacture A, B and C, when the alignment film of the upper substrate is thinner, the pre-tilt angle of liquid crystal molecules adjacent to the upper substrate becomes larger, thereby contributing to an increase in an overall average pre-tilt angle.

Further, it may be found from the comparison among the results of FIGS. 14A, 14B and 15 that the amount of micro protuberances, that is, mesogen polymers, constituting the photocured layer gives an influence on the pre-tilt angles of adjacent liquid crystal molecules.

While exemplary embodiments have been shown and described above, it will be apparent to those skilled in the art that modifications and variations could be made without departing from the spirit and scope of the invention as defined by the appended claims. The exemplary embodiments should be considered in a descriptive sense only and not for purposes of limitation.

What is claimed is:

1. A liquid crystal display device comprising:
a first substrate including one surface;
a second substrate including one surface and the other surface, the one surface of the second substrate facing the one surface of the first substrate, the other surface of the second substrate being a display surface from which light emits;
a first alignment layer which is disposed on the one surface of the first substrate, and which includes a polymeric material, and which has a first thickness;
a first photocured layer disposed on the first alignment layer;
a second alignment layer which is disposed on the one surface of the second substrate, and which includes a polymeric material same as the polymeric material in the first alignment layer, and which has a second thickness less than the first thickness;
a second photocured layer disposed on the second alignment layer; and
a liquid crystal layer which is interposed between the first photocured layer and the second photocured layer and which includes first liquid crystal molecules adjacent to the first photocured layer and second liquid crystal molecules adjacent to the second photocured layer,
wherein the second liquid crystal molecules are further vertically aligned than the first liquid crystal molecules in an initial aligned state,
wherein each of the first photocured layer and the second photocured layer being provided by polymerizing a photocuring agent,
wherein the photocuring agent includes reactive mesogens, and
wherein each of the first photocured layer and the second photocured layer includes a plurality of mesogen polymers where the reactive mesogens are polymerized, and a size of the plurality of mesogen polymers in the first photocured layer is larger than a size of the plurality of mesogen polymers in the second photocured layer.

2. The liquid crystal display device of claim 1, wherein each of the first alignment layer and the second alignment layer includes polyimide, the polyimide including a main chain including an imide group in a repeating group thereof, and a side chain substituted with a vertical aligner and/or a polymer initiator.

3. A liquid crystal display device comprising:
a first substrate including one surface;
a second substrate including one surface and the other surface, the one surface of the second substrate facing the one surface of the first substrate, the other surface of the second substrate being a display surface from which light emits;
a first alignment layer which is disposed on the one surface of the first substrate, and which includes a polymeric material, and which has a first thickness;
a first photocured layer disposed on the first alignment layer;
a second alignment layer which is disposed on the one surface of the second substrate, and which includes a polymeric material same as the polymeric material in the first alignment layer, and which has a second thickness less than the first thickness;
a second photocured layer disposed on the second alignment layer; and
a liquid crystal layer which is interposed between the first photocured layer and the second photocured layer and which includes first liquid crystal molecules adjacent to the first photocured layer and second liquid crystal molecules adjacent to the second photocured layer,
wherein the second liquid crystal molecules are further vertically aligned than the first liquid crystal molecules in an initial aligned state,
wherein the photocuring agent includes reactive mesogens,
wherein each of the first photocured layer and the second photocured layer includes a plurality of mesogen polymers where the reactive mesogens are polymerized, and a number of the plurality of mesogen polymers per unit area in the first photocured layer is larger than a number of the plurality of mesogen polymers per unit area in the second photocured layer.

4. The liquid crystal display device of claim 1, wherein the polymeric material included in the second alignment layer is substantially the same as the polymeric material included in the first alignment layer.

5. The liquid crystal display device of claim 1, wherein the first substrate includes a first base substrate and a pixel electrode disposed on the first base substrate,
and the second substrate includes a second base substrate and a common electrode disposed on the second base substrate.

6. The liquid crystal display device of claim 1, wherein the first substrate and the second substrate are curved in the same direction such that the other surface of the second substrate is concavely curved.

7. A method for manufacturing a liquid crystal display device, the method comprising:
preparing a first substrate including one surface on which a first alignment layer having a first thickness and including a photocuring agent is provided;
preparing a second substrate including one surface on which a second alignment layer including a material substantially same as a material of the first alignment layer, having a second thickness less than the first thickness, and including a photocuring agent is provided;
interposing a liquid crystal layer between the first alignment layer and the second alignment layer; and irradiating light in a state where an electric field is applied to the liquid crystal layer such that the photocuring agent is polymerized to form a first photocured layer and a second photocured layer respectively on a surface of the first alignment layer and a surface of the second alignment layer, wherein the photocuring agents in the first alignment layer and the second alignment layer include reactive mesogens, and wherein each of the first photocured layer and the second photocured layer includes a plurality of mesogen polymers where the reactive mesogens are polymerized, and a size of the plurality of mesogen polymers in the first photocured layer is larger than a size of the plurality of mesogen polymers in the second photocured layer.

8. The method of claim 7, wherein:

the preparing the first substrate including a first alignment layer disposed thereon includes:

providing a first aligning agent including a photocuring agent on the first substrate; and curing the first aligning agent to form the first alignment layer, the preparing the second substrate including a second alignment layer disposed thereon includes:

providing a second aligning agent including a material substantially same as a material of the first aligning agent on the second substrate; and curing the second aligning agent to form the second alignment layer, and the curing the second aligning agent includes a process condition same as a process condition of curing the first aligning agent.

9. The method of claim 8, wherein the second aligning agent is a composition same as the first aligning agent.

10. The method of claim 8, wherein the curing the first aligning agent includes:

firstly curing the first aligning agent; and secondarily curing the firstly-cured first aligning agent under a process condition different from a process condition of the first curing of the first aligning agent, and the curing the second aligning agent includes:

firstly curing the second aligning agent; and secondarily curing the firstly-cured second aligning agent under a process condition different from a process condition of the first curing of the second aligning agent.

11. The method of claim 10, wherein the secondarily curing the firstly-cured first aligning agent is performed at a higher temperature and for a longer time period than firstly curing the first aligning agent, and the secondarily curing the firstly-cured second aligning agent is performed at a higher temperature and for a longer time period than the firstly curing the second aligning agent.

12. The method of claim 8, wherein the curing the first aligning agent is performed simultaneously with the curing the second aligning agent in the same chamber.

13. The method of claim 8, wherein at least a part of the photocuring agent in the first aligning agent is lost in curing the first aligning agent, and at least a part of the photocuring agent in the second aligning agent is lost in curing the second aligning agent.

14. A method for manufacturing a liquid crystal display device, the method comprising:

preparing a first substrate including one surface on which a first alignment layer having a first thickness and including a photocuring agent is provided;

preparing a second substrate including one surface on which a second alignment layer including a material substantially same as a material of the first alignment layer, having a second thickness less than the first thickness, and including a photocuring agent is provided;

interposing a liquid crystal layer between the first alignment layer and the second alignment layer; and irradiating light in a state where an electric field is applied to the liquid crystal layer such that the photocuring agent is polymerized to form a first photocured layer and a second photocured layer respectively on a surface of the first alignment layer and a surface of the second alignment layer, wherein the photocuring agents in the first alignment layer and the second alignment layer include reactive mesogens, wherein each of the first photocured layer and the second photocured layer includes a plurality of mesogen polymers where the reactive mesogens are polymerized, and a number of the plurality of mesogen polymers per unit area in the first photocured layer is larger than a number of the plurality of mesogen polymers per unit area in the second photocured layer.

15. The method of claim 7, wherein the interposing the liquid crystal layer includes:

providing a liquid crystal composition; and bonding the first substrate and the second substrate to each other, and irradiating light after bonding the first substrate and the second substrate to each other.

16. The method of claim 7, further comprising irradiating light in a state where no electric field is generated after the irradiating the light.

* * * * *